April 5, 1938. LE ROY SHULMAN ET AL 2,112,929
INSEAM MEASURING DEVICE
Filed Jan. 6, 1936 2 Sheets-Sheet 1
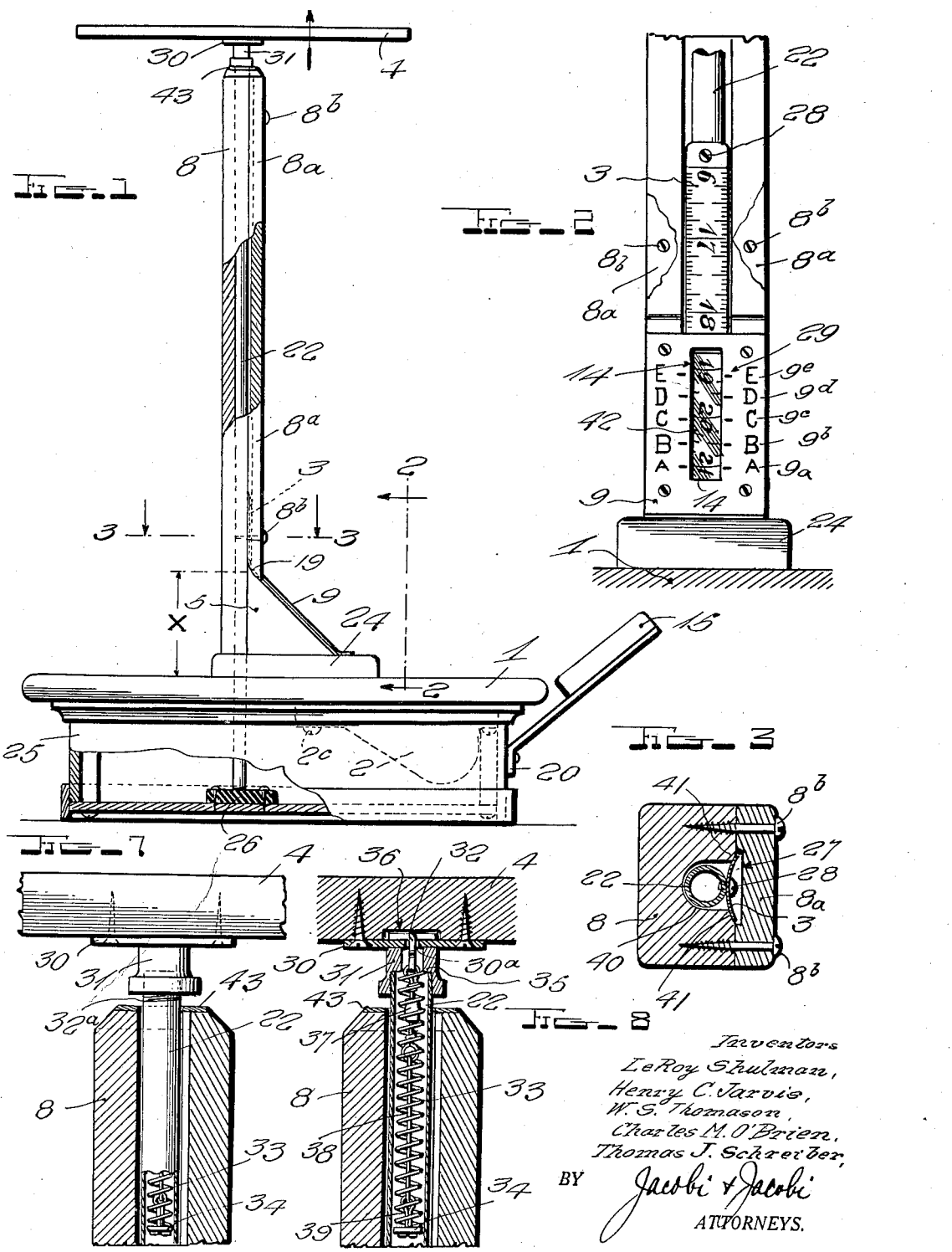
Inventors
LeRoy Shulman,
Henry C. Jarvis,
W. S. Thomason,
Charles M. O'Brien,
Thomas J. Schreiber,
BY Jacobi & Jacobi
ATTORNEYS.

April 5, 1938.  LE ROY SHULMAN ET AL  2,112,929
INSEAM MEASURING DEVICE
Filed Jan. 6, 1936  2 Sheets-Sheet 2
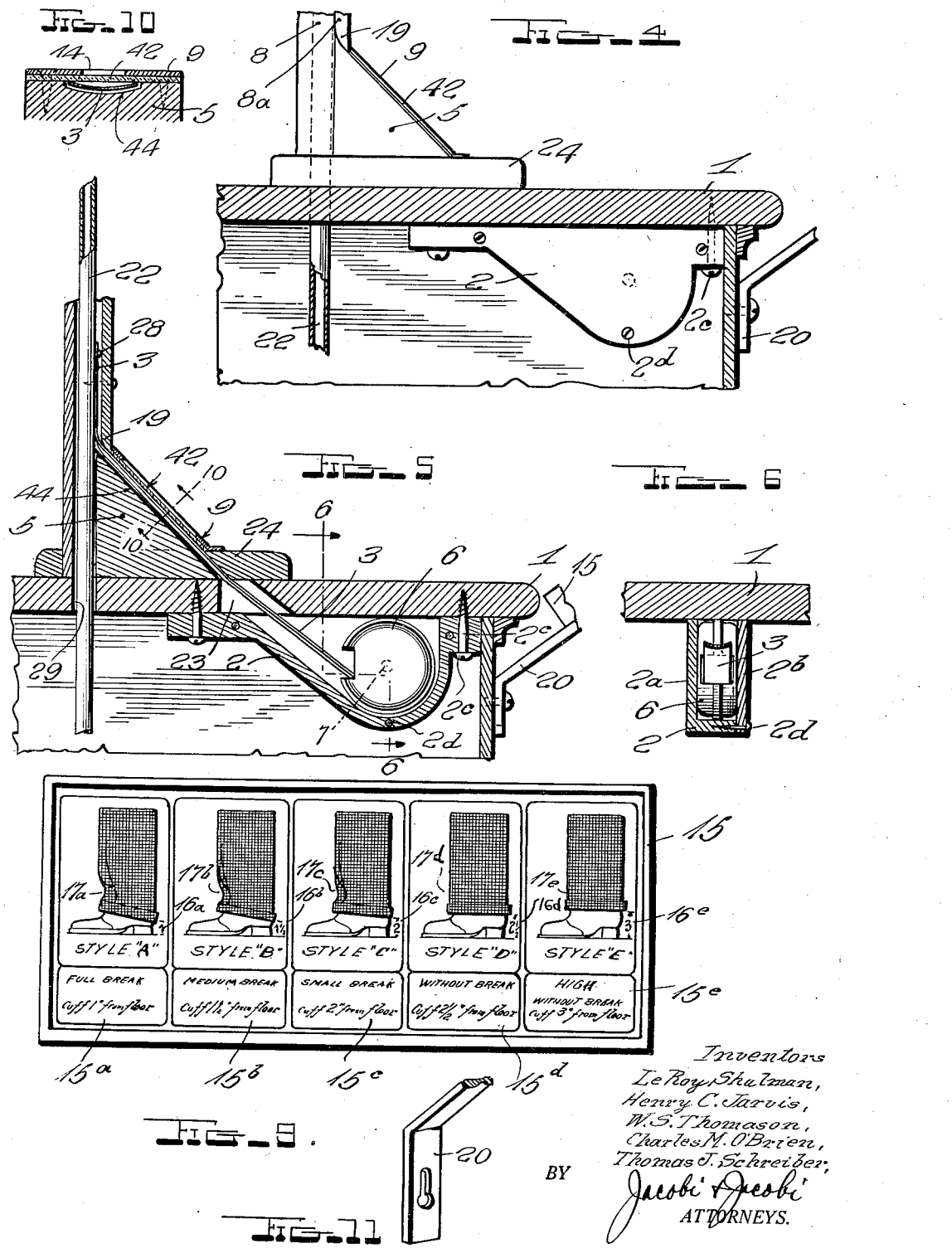

Patented Apr. 5, 1938

2,112,929

UNITED STATES PATENT OFFICE 2,112,929

INSEAM MEASURING DEVICE

Le Roy Shulman, Henry C. Jarvis, and William S. Thomason, Norfolk, Va., and Charles M. O'Brien and Thomas J. Schreiber, Baltimore, Md., assignors to Shulmansizer, Inc., Norfolk, Va.

Application January 6, 1936, Serial No. 57,842

15 Claims. (Cl. 33—8)

The present application covers an improvement on the invention described and claimed in the co-pending application Serial No. 46,436 filed October 23, 1935 by Le Roy Shulman and Henry C. Jarvis, two of the co-inventors in this present application.

Our invention relates to a measuring instrument intended to be employed by tailors, and is particularly suitable for making the inseam measurement of trouser legs, although it may also be employed for other purposes.

In the making of the inseam measurement, the tailor ordinarily holds the ends of the tape securely in position in the crotch, and guides the tape along the trouser leg down to the shoe, and reads off the distance to a point near the ankle where he believes the customer wishes the bottom of the trouser leg to fall, according to answers which the customer makes to the tailor's inquiries as to whether the customer wishes a long or short leg, and whether he wants a sharp or small break or no break in the bottom of the trouser leg. This requires the tailor to make a number of mental calculations in determining the point on the shoe to which he reads off the distance. The customer must stand straight, and has no opportunity to see the measurement being made by the tailor, or to verify the reading which the tailor calls off. Also, the customer has no facilities available to help him visualize what constitutes a sharp break and a small break, and how different lengths of leg measurement are related to the sharpness of break. This arrangement is satisfactory to neither the customer nor the tailor. Our invention also avoids the necessity of the tailor kneeling in making the measurement.

An object of our invention is to provide an inseam measuring device which avoids these disadvantages, and in which the tailor and customer can without bending read the proper inseam measurement corresponding to a desired style of bottom drape, without any mental calculations by the tailor being necessary.

Another object of our invention is to provide a device wherein a casing containing a measuring tape is fixedly mounted beneath a platform on which the customer stands.

A still further object of our invention is to provide a device in which the customer can observe pictorial representations of different styles of bottom drapes corresponding to different measuring register marks, while the measurement is being made.

Still another object of our invention is to provide a vertically adjustable rod for carrying a crotch-bar swivelably mounted thereon for translating the free end of the measuring tape when a measurement is being made.

A further object of our invention is to provide a novel type of swivel mounting of the crotch-bar on the top of the adjustable rod to facilitate the making of the measurement.

Another object is to provide a device which is easy to manufacture and assemble, low in cost and one which will be very efficient in application to use.

With these and numerous other objects in view, our invention consists in the novel features of construction, combination and arrangement of parts as will be hereinafter referred to and more particularly pointed out in the specification and claims.

We provide a swivelably mounted crotch-bar which the tailor holds in position, and a coilable ruled tape, which is mounted beneath a platform on which the customer stands, and on which tape the measurement is read off against a register mark. We provide a plurality of such register marks corresponding to different degrees of break of the trouser leg and different trouser leg lengths for a given person. We provide an obliquely positioned mounting for the tape and for the scale carrying the register marks, at the point where the measurement is read off, so that the measurement can be read off easily by the tailor or by the customer without either one having to bend. We also provide a display chart on which different styles of trouser bottoms, with different degrees of break, and different measured distances from the bottom of the trouser leg to the floor, are displayed, observable by the customer at the same time that he can see the reading of the tape. The display chart may also show different styles of finishing trouser bottoms, such as cuff bottoms and straight bottoms. The different styles displayed are correlated by reference letters with the different scale marks against which the tape reading is taken, so that the length can be easily determined which corresponds to the style which the customer desires.

In the aforementioned application Serial No. 46,436, a semi-rigid steel tape is employed which is held erect by vertical guides. In the improved form of apparatus herein described, a vertically adjustable rod carries the free end of the tape and also carries the crotch-bar at its top. Other features of our invention are a rubber bumper block which receives the impact of the vertical rod when dropped. Our crotch-bar is swivelably mounted on the top of this vertical rod, giving a greater freedom for adjustment. The tape casing is mounted beneath the platform, where it is out of the way and less likely to be damaged. The scale plate is mounted on an integral triangular block which abuts the channel carrying the vertical rod. In the present form, it is not necessary to use a metal or other semi-rigid tape, as in the earlier form of the invention.

Our invention will be better understood by reference to the following specification and the accompanying drawings wherein corresponding reference characters represent corresponding parts in all the figures, and wherein:

Figure 1 is a side elevation of the assembly of our invention, with parts broken away and in section;

Figure 2 is a detail of the front elevation taken on the line 2—2 of Figure 1 looking in the direction of the arrows, with parts broken away, showing the tape and its attachment to the adjustable rod, and the scale plate;

Figure 3 is a horizontal transverse section of the rod and tape guide channel taken on the line 3—3 of Figure 1;

Figure 4 is an elevation partly in section and with parts broken away showing on an enlarged scale the platform, tape housing, and scale mounting;

Figure 5 is a central vertical longitudinal sectional view of Figure 4;

Figure 6 is a sectional view taken on the line 6—6 of Figure 5 looking in the direction of the arrows, showing the tape casing and its housing;

Figure 7 is a detail elevation with parts in section and parts broken away of the swivel mount of the measuring bar and its retaining spring;

Figure 8 is a sectional view of the swivel mount of Figure 7, showing the helical spring and its attachment to the measuring bar;

Figure 9 shows the style chart of different styles of bottoms of trousers;

Figure 10 is a detailed transverse vertical section taken on the line 10—10 of Figure 5, showing the tape channel in the oblique face of the triangular block; and Figure 11 shows a detail of the detachable bracket supporting the style chart.

Referring to the figures in detail, in Figure 1, I is a platform whereon a person may stand who is to be measured. A suitable size for this platform is about 18 by 18 inches square and 7 inches high. Suitably mounted below this platform is a tape housing 2 containing and supporting a coiled graduated tape 3. This tape may be of thin flexible strip metal, but may also be formed of other suitable material, and is preferably treated to be self-coiling. Attached to one end of tape 3 is an attachment screw 28. A crotch or measuring bar 4 is swivelably mounted and adapted to be fitted by the tailor flexibly in the crotch in making the inseam measurement. A cylindrical casing 6 is mounted in the housing 2 and has a rotatable pinion 7 on which the tape is coiled. The usual spring winding means with ratchet and spring is provided for actuating the pinion and coiling up the tape, which is well known in the art, and therefore is not shown in detail. The casing 6 and the housing 2 are apertured for the passage of tape 3 therethrough.

A base plate 24 is centrally mounted on platform I, and supported therefrom is a vertical channel member 8 provided with a longitudinal central bore or channel throughout its length. Base 24 and platform I are apertured in register with the bore in channel member 8. A rod 22 which may advantageously be of metal, is displaceably or slidably mounted in the central channel in channel 8, so that its lower end projects through base 24 and platform I to impinge upon a rubber or other resilient cushion or bumper block 26 supported from the lower part of platform I. As shown particularly in Figure 6, the tape housing 2 is advantageously formed of two pieces, 2a and 2b, attached together by screws 2d and attached to the under face of platform I by screws 2c.

Mounted on base 24 is a scale block 5 which is advantageously in the form of a right triangular prism positioned on a base corresponding to a leg of the triangle, and mounted with its substantially vertical face abutting or engaging the sides of channel member 8 to form therewith a substantially continuous structure. Channel member 8 is advantageously formed of two parts, a main portion provided with a central groove forming the central channel, and a cover plate 8a attached by screws 8b to the main portion 8. The obliquely inclined face of triangular scale block 5 is provided with a central longitudinal groove 44 which is particularly shown in Figure 10. Mounted over this obliquely inclined face of scale block 5 in spaced relation thereto is a scale plate 9 which is particularly shown in Figure 2. Groove 44 is of suitable width to receive tape 3. As shown, tape 3 may be preferably formed with a convex contour, with the graduations on the concave side, to improve visibility. Scale plate 9 is provided with a central longitudinal slot 14 which is in register with the graduations on tape 3, and a transparent plate may be mounted within slot 14 to exclude dust. In the arrangement shown in Figure 10, a transparent sheet 42 is mounted over the face of scale block 5 above tape 3 and beneath scale plate 9.

Platform I and base 24 are apertured as shown particularly in Figure 5 for the passage therethrough of tape 3 from casing 6 to a lateral aperture formed in the portion 8a of channel member 8 near the point 19. Tape 3 continues through the aperture in 8a upwardly between rod 22 and wall 8a to a point on rod 22 where it is attached to said rod by a screw 28. The portion of 8a upon which tape 3 bears is rounded to facilitate passage of the tape thereover. The aperture 29 in the platform I permits of the passage of rod 22 therethrough. The knee point at which tape 3 bends obliquely away from the vertical position of its upper portion is designated by 19. As shown particularly in Figure 3, channel member 8 is provided with the central bore 40 having shoulders 41 whereon tape 3 bears, and the cover plate 8a which closes channel member 8 is provided with a recess 27 to receive the edges of tape 3. A convenient form of scale block 5 is, as shown in Figure 5, an isosceles right triangle, but triangles of other angles such as thirty degrees are also suitable. By making the readings on the portion of the tape which is carried over the obliquely inclined face of scale block 5, the graduations on the tape are much more readable by the person being measured or by the tailor, as compared with the difficulties of making such readings on either a horizontal or a vertical piece of tape.

Scale plate 9 is provided with one or more register marks, 9a, 9b, 9c, 9d, 9e, against which the readings of the graduations of the tape are made.

For the purpose which we have in view, it is desirable to provide a plurality of such registration marks on the scale plate, which correspond to different styles of trouser bottoms, as hereinafter described.

As shown in Figure 2, the several register marks 9a, 9b, 9c, 9d, 9e, are equally spaced, since such spacing is suitable for the styles of trouser bottoms here considered, but unequal spacings of the register marks may also be used if they are found desirable. When a plurality of register marks are used, they should be respectively identified by suitable reference characters to be noted by the observer; these are shown as A, B, C, D, E, and correspond to different styles of wearing trouser bottoms.

Mounted on one end of platform 1, by brackets 20, preferably in an oblique position, is a style display chart 15 which is readily visible to the person standing on the platform while being measured. This chart 15 is shown in detail in Figure 9, and includes a plurality of pictorial representations of the different "breaks" of the draping of the trouser bottoms as formed when the length of the trouser leg is cut to be different distances above the floor when hanging freely. In Figure 9, Style A, the full break 17a corresponds to a distance of one inch between the floor and the bottom of the freely hanging trousers. The medium break 17b, Style B, corresponds to a distance of 1½ inches between the floor and the trouser bottom. The small break 17c, Style C, corresponds to a distance of 2 inches between the floor and the trouser bottom. At 17d, Style D, is shown the trousers without break, corresponding to the distance of 2½ inches between the platform and the trouser bottom. Style E shows at 17e the trousers without break, but with the bottom hanging high, with a distance of 3 inches between the platform and the bottom of the trousers. The distances of 1 inch, 1½ inches, 2 inches, 2½ inches, 3 inches, are shown on the charts of Styles A, B, C, D, E, respectively at 16a, 16b, 16c, 16d, 16e. The scale marks A, B, C, D, E, on register plate 9, are also spaced one-half an inch apart, the same as the spacing between the respective distances 1, 1½, 2, 2½, 3 inches of style charts A, B, C, D, E. Whether a uniform or non-uniform spacing is maintained between adjacent style distances, the spacing between two adjacent register marks as A and B on scale plate 9, should correspond to the difference between the corresponding heights from platform 16a and 16b on corresponding adjacent style charts A, B.

In Figure 9, there are shown various styles of trouser bottom drapings, all for cuff bottoms. The chart may also show pictorial representations of the drapings of straight bottoms corresponding to different heights of the bottom from the platform when hanging freely, since the customer often desires a different kind of break for a straight bottom than he does for a cuff bottom. If the cuff styles are one-half an inch apart, as in Figure 9, it will ordinarily not be necessary to add additional register marks on scale plate 9 to take care of straight bottoms. It will suffice to place a panel of straight bottoms above the panel shown in Figure 9 of cuff bottoms, and to designate a desired style of straight bottom break by the same letter that designates one of the cuff bottom styles. The style charts for the straight bottoms will be assigned the proper letter A, B, C, D, E, corresponding to the respective heights from platform.

The distance along scale plate 9 from the knee point 19 where the tape bends, to a given register mark such as E corresponding to a height of 3 inches from the floor, depends on the height of knee point 19 from the platform or floor, and will be 3 inches less than the height of knee point 19 from the floor.

If the tape is to be held straight up vertically as shown in Figure 1, it will also be necessary to adjust the position of the scale marks as E so that the measurement will correspond to the distance along the inseam of the trouser leg itself, which adjustment can be made once for all, and is familiar to the trade.

The upper end of the rod 22 is provided with threads 32a as shown particularly in Figure 7. The crotch or measuring bar 4 is provided with a mounting plate 30 to which is attached a collar or nut 31 which is internally threaded to engage the threads 32a on rod 22. Plate 30 is centrally apertured at 30a for the passage therethrough of a cotterpin 32 whose legs are laterally bent over in a recess 36 in bar 4 and are engaged and confined by plate 30. A helical spring 33 is axially positioned in a longitudinal bore within rod 22, and the upper end of helical spring 33 engages a shoulder 35 formed at the point where collar 31 fits onto rod 22. The lower end of the helical spring 33 is restrained by a bearing plate 34 which is apertured to receive the bent over legs of a second cotterpin 39. A connector 38, which may be a stiff wire, engages the loop of cotterpin 39 and extends upwardly to engage one terminal of a swivel joint 37. The other terminal swivel joint 37 is similarly connected to the loop of cotterpin 32. This arrangement makes it possible to tilt or rock the crotch-bar 4 on the upper end of collar 31, the bearing plate 30 bearing against collar 31. This gives a substantially universal movement of crotch-bar 4 and makes it easily responsive to movement in any desired direction.

One advantageous form of construction for the assembly of triangular scale block 5 and vertical channel member 8 is to terminate cover plate 8a of channel member 8 at the point where the inclined face of scale block 5 meets cover plate 8a, bevelling the lower end of cover plate 8a to fit snugly upon the inclined face of scale block 5. This provides a compact and integral construction of the scale block and channel member.

A terminal plate 43, preferably of metal, is provided at the upper end of channel member 8, and is provided with a central aperture to receive rod 22.

The portion of tape 3 extending for a short distance from its zero mark is cut off, so that when its free end is attached at 28 to rod 22, the graduation of the tape 3 opposite a scale mark on scale plate 9 will correspond to the height being measured of crotch-bar 4 above platform 1.

In making an actual measurement the tailor will hold the crotch-bar 4 snugly in the crotch and swivelably adjust it to the desired position. The customer will select on the chart 15 the style of drape, A, B, C, D, or E, which he desires, and the tailor, can then, without bending over, read directly against register mark A, B, C, D, or E, on scale plate 9, the inseam measurement to which the trouser leg should be cut to give the desired effect. The customer can without bending or departing from the upright position which he must maintain while a measurement is being made, verify the length which the tailor reads off from the tape, while the customer can at the same time observe the style chart 15. The employment of the crotch-bar 4 avoids embarrassment to the customer, and the swivelable adjustment of the crotch-bar facilitates fitting it in desired manner in the crotch, to find the proper measuring point.

Our device is simple and convenient in employment, and greatly facilitates the making of the inseam measurement.

While we have described our device particularly with reference to the making of the inseam measurement, it will be obvious that it is equally adapted to the making of many measurements, and that slight modifications therein may be made to adapt it to particular measurements, which modifications will be obvious to those skilled in the art.

Having thus described the invention what is claimed is:

1. In an inseam measure, a platform, a base member having an obliquely inclined face mounted on said platform, a tape casing, a coiled graduated tape displaceably mounted in said casing, said casing being mounted adjacent said inclined face of said base member and being apertured for the passage of said tape outside said casing along said inclined face, a substantially vertical channel member provided with a central channel and mounted on said platform passing adjacent the upper end of said inclined face and being laterally apertured in register with said inclined face, a rod displaceable within said channel in said channel member, said tape being trained over said inclined face through said aperture in said channel member and having its free end attached to said rod, and a scale plate provided with a register mark mounted on said inclined face in reading register with the path of said tape therealong, whereby the magnitudes of displacement of said rod may be read on said tape against said register mark on said scale plate.

2. In an inseam measure, a platform, a base member having an obliquely inclined face mounted on said platform, a tape casing provided with a circumferential tape slot mounted beneath said platform, a coiled graduated tape displaceably mounted in said casing, said platform being apertured adjacent the end of said inclined face nearest said platform, a substantially vertical channel member mounted adjacent the upper end of said inclined face and being laterally apertured in register with said inclined face, a rod displaceable within said channel member, said tape being trained over said oblique face through said apertures in said platform and channel member and having its free end attached to said rod, and a scale plate provided with a register mark mounted on said inclined face in reading register with the path of said tape thereover, whereby the magnitudes of displacement of said rod may be read on said tape against said register mark on said scale plate.

3. In an inseam measure, a platform, a base member having an obliquely inclined face mounted on said platform, a tape casing, a coiled graduated tape displaceably mounted in said casing, said casing being mounted on said platform adjacent said oblique face of said base member and being apertured for the passage of said tape outside said casing along said inclined face, a substantially vertical channel member provided with a central channel mounted on said platform adjacent the upper end of said inclined face and being laterally apertured in register with said inclined face, said platform being provided with a channel aperture in register with said channel in said channel member, a rod displaceable within said channel in said channel member and through said aperture in said platform, a resilient block mounted on said platform below and in register with said channel aperture therein for the impact of said rod thereon, said tape being trained over said oblique face through said aperture in said channel member and having its free end attached to said rod, and a scale plate provided with a register mark mounted on said inclined face in reading register with the path of said tape thereover, whereby the magnitudes of displacement of said rod may be read on said tape against said register mark on said scale plate.

4. In an inseam measure, a platform, an integral triangular prism base member mounted on said platform with one edge of the triangular base thereof upon said platform and with a second edge of said triangular base member obliquely inclined with reference to said platform, the inclined edge of said prism being provided with a longitudinal central groove, a tape casing, a coiled graduated tape displaceably mounted in said casing, said casing being mounted adjacent said oblique face of said base member and being apertured for the passage of said tape outside said casing along said inclined face, a substantially vertical channel member provided with a central channel mounted on said platform abutting the third edge of the triangular base of said prism forming therewith a continuous structure, said channel member being laterally apertured in register with the end of said inclined face continuous to said channel member, a rod displaceable within said channel in said channel member, said tape being trained along said groove on said inclined face and through said aperture in said channel member and having its free end attached to said rod, and a scale plate provided with a register mark mounted on said inclined face in reading register with the path of said tape thereover, whereby the magnitudes of displacement of said rod may be read on said tape against said register mark on said scale plate.

5. An inseam measure comprising the subject matter as recited in claim 1, said rod projecting upwardly above said channel member, and a crotch-bar mounted on the top end of said rod.

6. An inseam measure comprising the subject matter as recited in claim 1, said rod projecting upwardly above said channel member, swivel bearing means carried on the upper end of said rod, and a crotch-bar mounted on said swivel bearing means for swivel adjustment with reference to said bar.

7. In an inseam measure, a platform, a tape casing mounted on said platform, a coiled graduated tape displaceably mounted in said casing, a substantially vertical channel member provided with a central channel mounted on said platform and being laterally apertured to receive said tape, a rod displaceable within said channel in said channel member and projecting upwardly above said channel member, a scale plate adjacent said aperture in said channel member, said tape being trained along said scale plate through said aperture in said channel member and having its free end attached to said rod, a crotch-bar, and means for swivelably mounting said crotch-bar on the upper end of said rod comprising a helical spring engaging said rod and carrying a connecting member engaging said crotch-bar, said connecting member comprising a swivel joint.

8. In an inseam measure, a platform, vertical channel guide means mounted on said platform, a rod displaceable in said channel guide means, a crotch-bar swivelably mounted on the upper end of said rod, and a storable graduated tape having one end mounted in fixed position relative to said platform and the other end attached to said rod, said guide means comprising a register mark past which said tape is guided.

9. In an inseam measure, a platform, a base member having an obliquely inclined face mounted on said platform, a tape casing, a coiled graduated tape displaceably mounted in said casing, said casing being mounted adjacent said inclined face of said base member and being apertured for the passage of said tape outside said casing along said inclined face, a substantially vertical channel member provided with a central channel and mounted on said platform passing adjacent the upper end of said inclined face and being laterally apertured in register with said inclined face, a rod displaceable within said channel in said channel member, said tape being trained over said inclined face through said aperture in said channel member and having its free end attached to said rod, and a scale plate provided with a register mark mounted on said inclined face in reading register with the path of said tape therealong, whereby the magnitudes of displacement of said rod may be read on said tape against said register mark on said scale plate.

10. In an inseam measure, a base, a standard mounted thereon, and provided with a sight opening having register marks, a shiftable rod on said standard, a flexible measuring tape connected with said shiftable rod, and means mounted on said base for spirally storing said tape, said tape being movable past said sight opening to permit a reading to be taken of the inseam measurements.

11. In an inseam measure, a base, a standard mounted thereon, having an obliquely inclined surface and provided with a sight opening in said inclined surface having register marks, a shiftable rod on said standard, a flexible measuring tape connected with said shiftable rod, and means mounted on said base for spirally storing said tape, said tape being movable past said sight opening to permit a reading to be taken of the inseam measurements.

12. In a measuring device for application to a contoured body, a support, a measuring element carried by said support translatably with reference thereto, means for indicating the relative positions of said element and said support, a contact bar for application to said body, and universal joint mounting means carried by said measuring element for universally mounting said contact bar on said measuring element.

13. In a measuring device for application to a contoured body, a support, a measuring element carried by said support translatably with reference thereto, a graduated tape carried by said measuring element and translatable along said support, said support being provided with a register mark adjacent the path of said tape therealong, a contact bar for application to said body, and universal joint mounting means carried by said measuring element for universally mounting said contact bar on said measuring element.

14. A measuring apparatus of the character described comprising a flat base, a vertically disposed tubular member, a support for said member fixed on said base, a vertically shiftable element mounted in said tubular member, a horizontally disposed crotch bar carried at the upper end of said element, a tape measure having an end thereof joined with said element, a casing for said tap measure mounted in said support, and means for visibly indicating the measurement effected by the movement of said element in said member and including a dial plate provided with indicia, said means being carried by said support and inclining at an angle from the horizontal.

15. In an inseam measure, a channel member provided with a channel, a rod displaceable within said channel member, graduated scale means on said rod and displaceable therewith, and selective register mark means in reading register with the graduations on said scale means adapted to provide a plurality of spaced positions of register mark against which the graduations of said scale means may be read.

LE ROY SHULMAN.
HENRY C. JARVIS.
WILLIAM S. THOMASON.
CHARLES M. O'BRIEN.
THOMAS J. SCHREIBER.